(12) United States Patent
Wilder

(10) Patent No.: US 9,440,310 B2
(45) Date of Patent: Sep. 13, 2016

(54) MONOLITE PISTON LASER WELDING SPATTER CONTROL

(71) Applicant: Mahle International GmbH, Stuttgart (DE)

(72) Inventor: Montgomery L. Wilder, Morristown, TN (US)

(73) Assignee: Mahle International GmbH (DE)

( * ) Notice: Subject to any disclaimer, the term of this patent is extended or adjusted under 35 U.S.C. 154(b) by 361 days.

(21) Appl. No.: 13/741,911

(22) Filed: Jan. 15, 2013

(65) Prior Publication Data

US 2014/0197142 A1    Jul. 17, 2014

(51) Int. Cl.
*B23K 26/00* (2014.01)
*B23K 35/24* (2006.01)
(Continued)

(52) U.S. Cl.
CPC ........... *B23K 26/16* (2013.01); *B23K 26/0823* (2013.01); *B23K 26/28* (2013.01);
(Continued)

(58) Field of Classification Search
CPC .... B23K 26/246; B23K 26/24; B23K 26/20; B23K 26/3206; B23K 2203/04; B23K 2201/003; B23K 26/0823; B23K 26/18; B23K 26/26; B23K 26/22; B23K 26/423; B23K 9/0253; B23K 9/0282; B23K 9/0284; B23K 9/0286; B23K 9/035; B23K 9/328; B23K 37/06; F02F 3/003; F02F 3/06; F02F 2003/0061; F02F 3/00; F02F 3/0015; F02F 3/0023; F02F 3/22; F02F 2200/04; F02F 2200/06; B21K 1/18; B23P 15/10; Y10T 29/49252; Y10T 29/49288; Y10T 29/49266; B29C 31/063; B29C 31/068; F02M 35/10354; F02M 35/1036; F02M 2200/8084
USPC .............. 219/121.64, 121.6, 121.63, 121.65, 219/121.66, 121.67, 121.69, 121.71, 121, 7, 219/2, 121.76, 121.77, 121.82, 121.85, 219/121.86, 59.1, 60 R, 61, 61.12, 121.14, 219/121.46, 137 R, 117.1, 145.1–147; 72/377; 29/888.042, 888.09, 29/888.04–888.051, 888.07–888.076, 29/423–424; 92/186, 214, 224, 231, 222, 92/260, 172, 188, 189, 190, 216, 218; 123/41.16, 41.34, 41.35, 41.36, 41.37, 123/193.6, 193.5, 193.4, 193.2, 193.1, 269, 123/270, 276, 279, 18 A, 41.31, 41.33, 123/41.39, 196 M; 228/47.1, 48, 49.1–49.3, 228/49.6, 214–215, 223–226, 245–262, 37, 228/41
See application file for complete search history.

(56) References Cited

U.S. PATENT DOCUMENTS 3,319,536 A    5/1967    Kohl et al.
3,353,970 A *  11/1967   Bowers ................ B23K 35/224
                                                           106/2

(Continued)

FOREIGN PATENT DOCUMENTS

CH    407712 A     2/1966
DE    2017925 A1   10/1971
(Continued)

OTHER PUBLICATIONS

International Search Report dated Jul. 14, 2014 in related matter PCT/US2014/011636.

*Primary Examiner* — David Angwin
*Assistant Examiner* — Gyounghyun Bae
(74) *Attorney, Agent, or Firm* — Fishman Stewart PLLC

(57) ABSTRACT

An exemplary system and method for welding a piston assembly includes a piston assembly having a cooling gallery and a loose granulated medium positioned therein. The cooling gallery is formed by a piston body and a cooling gallery ring, and a welder such as a laser welder is positioned proximate the assembly to weld the piston body to the cooling gallery ring. During welding, the assembly is rotated and the loose granulated medium is caused to remain in a gravitationally low portion of the cooling gallery. The weld is formed in an area proximate the loose granulated medium such that weld spatter emitted during welding is emitted into the loose granulated medium.

14 Claims, 6 Drawing Sheets

(51) Int. Cl.
*F16J 1/00* (2006.01)
*B21D 31/00* (2006.01)
*B23P 15/10* (2006.01)
*B23K 15/00* (2006.01)
*B23K 26/16* (2006.01)
*B23K 26/08* (2014.01)
*B23K 26/28* (2014.01)
*F02F 3/00* (2006.01)
*F02F 3/22* (2006.01)

(52) U.S. Cl.
CPC .............. *B23K 26/70* (2015.10); *F02F 3/003* (2013.01); *B23K 2201/003* (2013.01); *F02F 3/22* (2013.01); *F02F 2003/0061* (2013.01)

(56) References Cited

U.S. PATENT DOCUMENTS

| | | | |
|---|---|---|---|
| 3,413,897 A | 12/1968 | Atkin | |
| 4,532,403 A * | 7/1985 | Jordan et al. | 219/121.14 |
| 4,651,631 A | 3/1987 | Avezou | |
| 4,861,392 A * | 8/1989 | Grabe | 148/23 |
| 5,278,392 A * | 1/1994 | Takacs | B23K 9/328 219/136 |
| 6,112,642 A * | 9/2000 | Jarrett et al. | 92/186 |
| 6,586,705 B1 * | 7/2003 | Schell | 219/121.67 |
| 7,484,295 B2 * | 2/2009 | Appo | 29/888.045 |
| 8,776,670 B2 * | 7/2014 | Lapp et al. | 92/186 |
| 2007/0090168 A1 * | 4/2007 | Snow et al. | 228/101 |
| 2008/0076232 A1 * | 3/2008 | Hozawa | 438/460 |
| 2009/0020007 A1 * | 1/2009 | Lin et al. | 92/186 |
| 2011/0132971 A1 * | 6/2011 | Kolbe et al. | 228/114 |
| 2011/0197845 A1 * | 8/2011 | Flowers et al. | 123/193.6 |
| 2012/0037111 A1 * | 2/2012 | Scharp et al. | 123/193.6 |
| 2012/0037112 A1 * | 2/2012 | Muscas | 123/193.6 |
| 2012/0037115 A1 * | 2/2012 | Schnaiter et al. | 123/193.6 |

FOREIGN PATENT DOCUMENTS

| | | |
|---|---|---|
| DE | 2141054 A1 | 3/1973 |
| DE | 102007005268 A1 | 8/2007 |
| GB | 1501387 A | 2/1978 |
| GB | 2235893 A | 3/1991 |
| WO | WO-2005046928 A1 | 5/2005 |

* cited by examiner

MONOLITE PISTON LASER WELDING SPATTER CONTROL

BACKGROUND

Internal combustion engine manufacturers are constantly seeking to increase power output and fuel efficiency of their products. One method of generally increasing efficiency and power is to reduce the oscillating mass of an engine, e.g., of the pistons, connecting rods, and other moving parts of the engine. Efforts to increase engine power and/or efficiency may also result in an increase in pressure and/or temperature within the combustion chamber during operation.

Engines, and in particular the pistons of the engine, are therefore under increased stress as a result of these reductions in weight and increased pressures and temperatures associated with engine operation. Piston cooling is therefore increasingly important for withstanding the increased stress of such operational conditions over the life of the engine.

To reduce the operating temperatures of piston components, an internal cooling gallery may be provided about a perimeter of the piston. A coolant such as crankcase oil may be introduced to the cooling gallery during piston operation, and may be distributed about the cooling gallery by the reciprocating motion of the piston, thereby reducing the operating temperature of the piston.

The cooling galleries may increase overall complexity of the piston and manufacturing of the same. For example, cooling galleries may include an additional component, such as a cooling gallery cover, in order to encourage and direct proper circulation of a coolant throughout the cooling gallery by temporarily trapping coolant (e.g., oil) that is circulated through the cooling gallery. The additional components (such as cover plates) also add complexity, however, and may be expensive and/or difficult to form in smaller piston applications such as in the case of lightweight or light duty pistons. Additionally, known methods of forming enclosed cooling galleries in one-piece pistons, such as friction welding, include extremely high strength piston components to properly form the piston and cooling gallery features without unintended deformation during the friction welding process, thereby increasing size and weight of the resulting pistons. The large magnitude forces placed on the piston components during the friction welding process also limits where the weld joints may be located.

As such, other known methods of forming enclosed cooling galleries in one-piece pistons include laser welding of the cooling gallery cover to the piston. Typically the piston is initially formed having the cooling gallery formed therein, a cooling gallery ring is separately formed, and the cooling gallery cover is laser welded to the piston in order to form the cooling gallery within the piston. In order to obtain complete penetration of the weld, sufficient power is provided such that a fusion joint is formed throughout the depth of the parts being welded. However, in so doing a weld spatter is caused to emit from the weld or fusion joint, causing particulate to adhere to inner portions of the cooling gallery. The weld spatter can be difficult to remove because the spatter can attach to the walls of the cooling gallery and once the cooling gallery ring is attached. If weld spatter cannot be removed from within the cooling gallery, production parts may have to be scrapped because spatter can interfere with coolant flow or could cause performance issues with the piston if the spatter were to break free during operation.

Accordingly, there is a need for a laser welding process in formation of a cooling gallery in which weld spatter into the cooling gallery is minimized.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of methods of making a piston assembly and a system of making the same. An exemplary piston may include a piston body defining a piston axis, the piston body having a skirt and forming a lower surface of a cooling gallery. The body may include radially inner and outer body mating surfaces. The piston may further include a cooling gallery ring cooperating with the piston body to form a continuous upper combustion bowl surface. The cooling gallery ring may include a radially inner ring mating surface abutted along a radially inner interface region in the combustion bowl with the radially inner body mating surface, with the cooling gallery ring including a radially outer ring mating surface abutted along a radially outer interface region with the radially outer body mating surface such that the cooling gallery is substantially enclosed. The piston body and cooling gallery ring may be joined together along the radially inner and radially outer interface regions to form a generally one-piece piston assembly.

In some exemplary illustrations, pistons may be joined in a welding process, e.g., a laser welding process. Exemplary laser welding processes, as will be described further below, may facilitate substantial gains in manufacturing flexibility. In one example, at least one of the radially inner and outer mating surfaces is aligned non-perpendicular to the piston axis. For example, a generally vertical weld joint is possible, i.e., where the corresponding mating surfaces of two piston components being joined are aligned generally parallel to a longitudinal axis of the piston. Moreover, abutting surfaces of a laser welded joint may define virtually any angle so long as the joint is accessible by an impinging laser welding beam. Furthermore, when forming the laser welds, weld spatter that emits into the cooling gallery is prevented from adhering to the walls thereof because of a loose granular medium that is positioned within the cooling gallery prior to the welding process.

Figure 1:
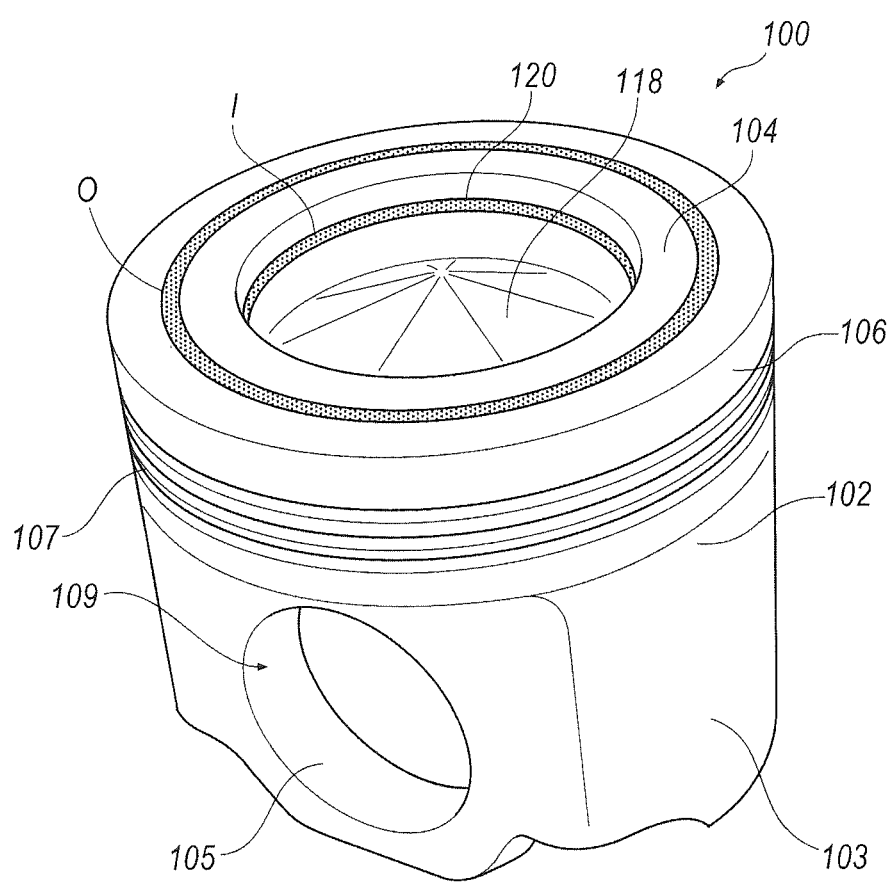
FIG. 1 is a perspective view of an exemplary piston assembly.

Turning now to FIG. 1, an exemplary piston assembly 100 is illustrated. Piston assembly 100 may include a piston body 102 and a cooling gallery ring 104 that is received in the body 102. The piston body 102 and cooling gallery ring 104 may thereby define a combustion bowl 120 having a combustion bowl lower surface 118. The body 102 may include a ring belt portion 106 that is configured to seal against an engine bore (not shown) receiving the piston assembly 100. For example, the ring belt portion 106 may define one or more circumferential grooves 107 that receive piston rings (not shown), which in turn seal against engine bore surfaces during reciprocal motion of the piston assembly 100 within the engine bore. Receipt of the cooling gallery ring 104 within the body 102 may allow flexibility in regard to the size and shape of the cooling gallery ring 104 and/or the piston assembly 100, e.g., allowing a lower overall compression height and/or center of gravity of the piston assembly 100.

The piston body 102 may include a skirt surface 103 that generally supports the piston assembly 100 during engine operation, e.g., by interfacing with surfaces of an engine bore (not shown) to stabilize the piston assembly 100 during reciprocal motion within the bore. For example, the skirt surface 103 may generally define a circular outer shape about at least a portion of a perimeter of the piston assembly 100. The outer shape may correspond to the engine bore surfaces, which may be generally cylindrical.

The body 102 may also define piston pin bosses 105. The piston pin bosses 105 may generally be formed with apertures or pin bores 109 configured to receive a piston pin (not shown). For example, a piston pin may be inserted through the pin bores 109 in the piston pin bosses 105, thereby generally securing the piston 100 to a contacting rod (not shown).

Figure 2A:
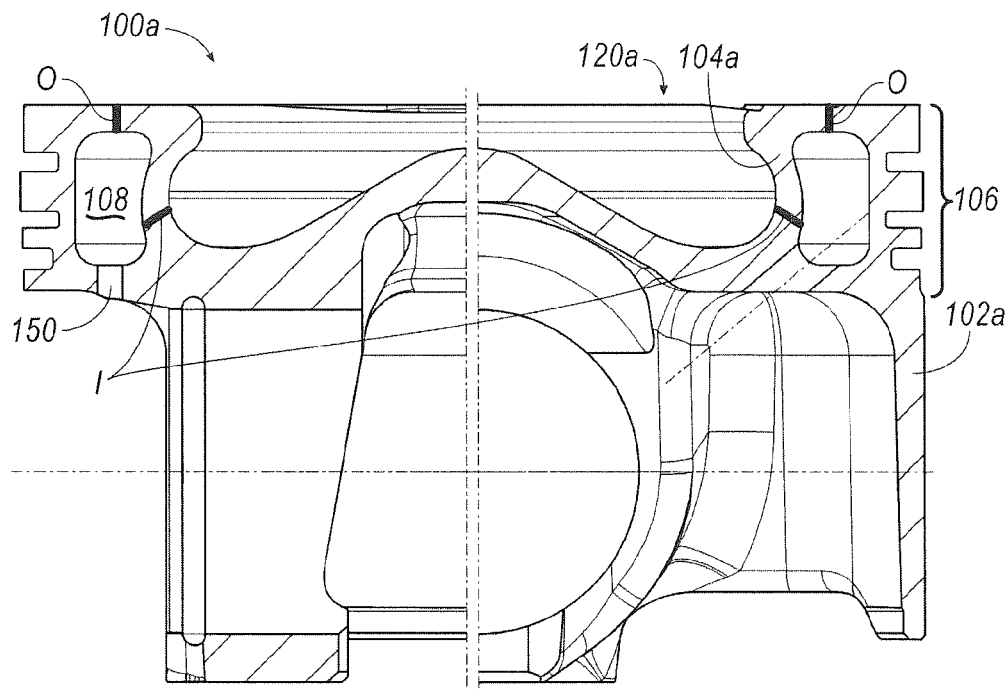
FIG. 2A is a partial section view of an exemplary piston assembly.
Figure 2B:
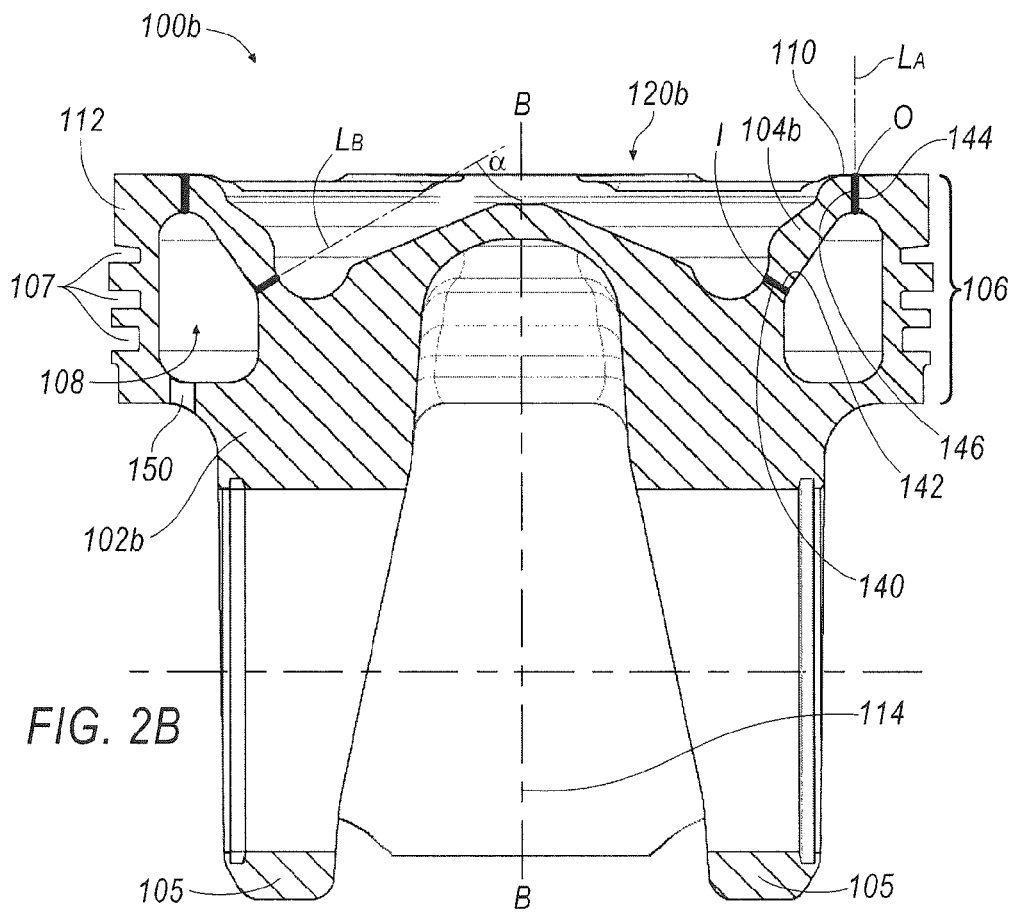
FIG. 2B is a partial section view of another exemplary piston assembly.
Figure 2C:
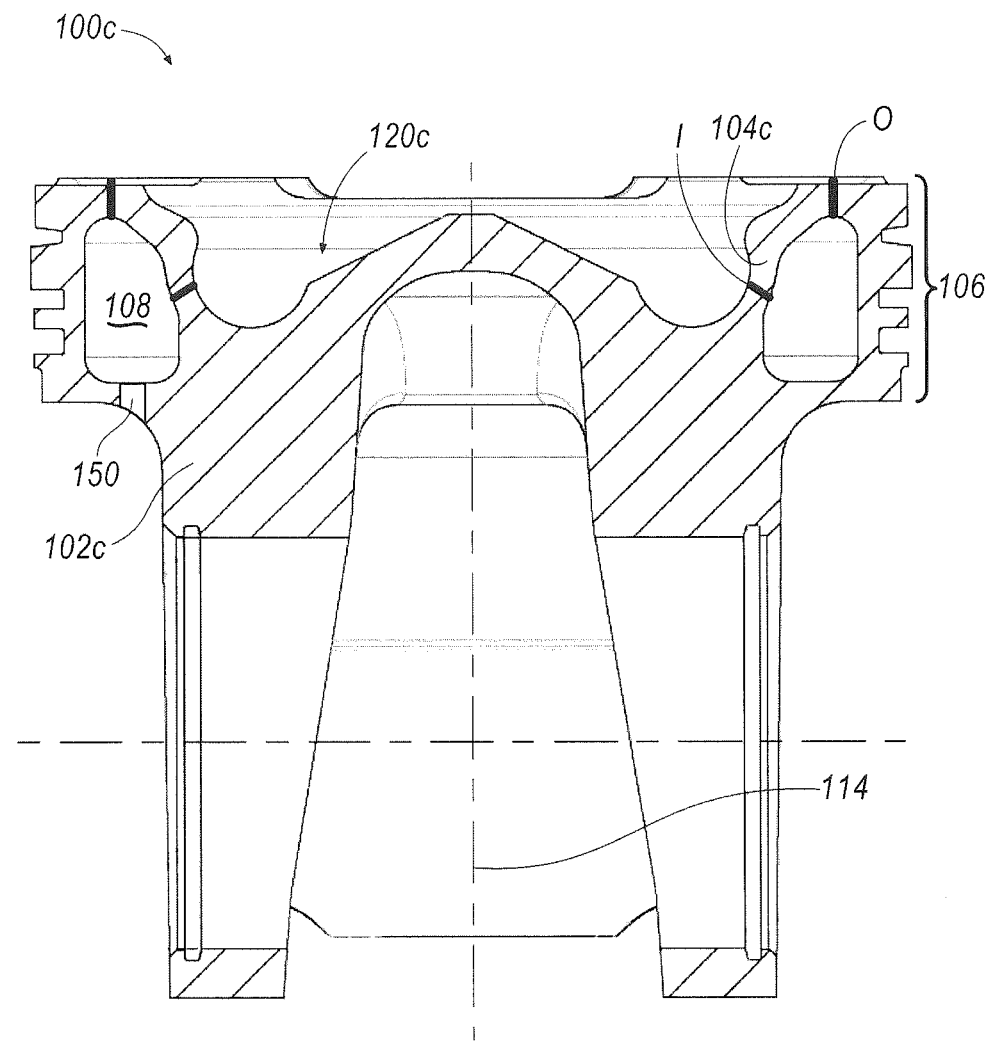
FIG. 2C is a partial section view of another exemplary piston assembly.

Turning now to FIGS. 2A, 2B, and 2C, exemplary pistons 100a, 100b, and 100c (collectively, 100) are illustrated in further detail. Each of the pistons 100 may have a ring belt portion 106 which define, at least in part, a cooling gallery 108. The cooling gallery 108 generally extends about a perimeter of a piston crown, and may circulate a coolant during operation, e.g., engine oil, thereby reducing an operating temperature of the piston. Additionally, the circulation of the coolant may facilitate maintaining a more stable or uniform temperature about the piston 100, and especially in the upper portion of the piston assembly 100, e.g., adjacent the combustion bowl 120.

A piston body 102 and ring 104 may be fixedly joined, e.g., in a laser welding process. By fixedly joining the piston body 102 and ring 104, the piston assemblies 100a, 100b, 100c are generally formed as a one-piece assembly.

Each of the pistons 100a, 100b, and 100c, the body 102 and ring 104 components may be joined along both a radially inner interface region I, and a radially outer interface region O, in a laser welding process. Accordingly, the piston bodies 102a, 102b, 102c (collectively, 102) may be generally unitized with their respective cooling gallery rings 104a, 104b, 104c (collectively, 104), such that each is immovable relative to the other after securement to the crown, although the body 102 and ring 104 are separate components. The cooling gallery rings 104 may be secured to the body 102 such that the body 102 and the ring 104 cooperate to form a continuous upper combustion bowl surface 120 of the piston assembly 100.

Referring now to FIG. 2B, corresponding radially outer mating surfaces 144, 146 of the body 102 and ring 104, respectively, may meet along the upper surface 110 in a radially outer interface region O of a piston 100, e.g., piston 100b. Additionally, corresponding radially inner mating surfaces 140, 142 of the body 102 and ring 104, respectively, may meet within the combustion bowl 120 along the radially inner interface region I such that the cooling gallery ring 104 defines a first radially outer portion 120b of the combustion bowl 120 that is disposed radially inwardly of the radially inner interface region I.

The combustion bowl surface 120 may be substantially smooth across an interface, e.g., radially inner interface region I and/or radially inner interface region O, between the ring 104 and the body 102, thereby minimizing disruptions and/or discontinuities in the surface 120. Minimizing such disruptions or discontinuities may generally reduce cracks or other loosening of an interface between the body 102 and the ring 104 along the interface regions I, O during normal long-term operation. Accordingly, any defects or failure in the combustion bowl surface 120, e.g., due to wear occurring during operation of an engine using piston assembly 100, may be minimized. As will be described further below, welding and/or machining operations used in the formation of piston assembly 100 may reduce surface irregularities in the combustion bowl surface 120.

The piston body 102 and the cooling gallery ring 104 may be secured or fixedly joined to one another in a welding operation such as laser welding. In one exemplary illustration, the piston body 102 and cooling gallery ring 104 are secured to one another along both the radially inner and outer interface regions I, O. A laser weld may allow the weld tool to form a generally smooth combustion bowl surface 120 requiring at most minimal machining operations before and/or after a welding process associated with joining the body 102 and the cooling gallery ring 104. Moreover, in some examples no machining at all may be necessary.

A laser welding operation may generally allow the formation of a solid metallic weld between the body 102 and the ring 104 while also minimizing the size of an associated heat affected zone. More specifically, a weld laser may generally be employed to propagate a heat affected zone in the radially inner interface region I and/or radially outer interface regions O, which may include or be directly adjacent mating surfaces of the body 102 and ring 104, thereby welding together the body 102 and ring 104 along the mating surfaces in the interface regions I, O. For example, a heat affected zone of the radially outer interface region O may include both the radially outer mating surface 144 of the body 102, and the radially outer mating surface of the ring 104.

Where the ring 104 and body 102 are joined using a laser welding process, a weld laser may be used in a generally continuous welding process that extends substantially about the entire circumference of the interface regions I and/or O, such that the weld extends substantially about the entire piston 100. Alternatively, a series of discrete welds may be made along the circumferential extent of the interface region I and/or O.

As noted above, the radially inner interface region I may be positioned along the combustion bowl surface 120. The radially outer interface region O may be positioned along an upper surface 110 of the piston 100b. The positioning of the radially outer interface region O in the upper surface 110 may advantageously allow the body 102, e.g., along the piston ring belt portion 106, to support the cooling gallery ring 104, especially when the piston 100 is installed within a corresponding bore (not shown). The additional support of the cooling gallery ring 104 in this manner may thereby increase durability of the piston 100 and resistance to high temperature and pressure. In another exemplary illustration, the radially outer interface region O may be positioned along an outer wall 112 of the piston 100, e.g., along the ring belt portion 106.

A laser welding operation used to join the body 102 and cooling gallery ring 104 may have several advantages compared with other welding methodologies such as friction welding. A laser welding operation typically results in a relatively small heat-affected zone, sometimes as little as a few millimeters. Nevertheless, the heat affected zone may advantageously include a mating surface of the body 102 as well as a corresponding mating surface of the ring 104, as will be described further below. Additionally, a laser weld may be performed in virtually any location on the piston 100 that can be accessed by an impinging laser beam. Accordingly, a laser welding operation may allow substantial flexibility in choosing the location on the piston 100 for an interface region between the body 102 and ring 104, e.g., the radially inner and outer interface regions I, O.

Accordingly, laser welding processes may be advantageous in examples such as those illustrated in FIGS. 2A, 2B, and 2C, where the radially outer interface region O includes generally vertical mating surfaces 144, 146, and where the inner interface region I includes mating surfaces 140, 142 that are angled non-parallel and non-orthogonally with respect to an axis 114 of the piston 100, e.g., axis B-B (114), as best seen in FIG. 2B.

A laser beam associated with a laser welding operation of the interface regions I, O may be directed generally or substantially parallel to mating surfaces of the body 102 and ring 104 in the interface regions I, O. In one exemplary illustration, a laser beam employed in a laser welding process is angled with respect to the piston axis 114. For example, as illustrated in FIG. 2B, a laser beam $L_B$ may be directed at an angle α with respect to the piston axis 114 when directed to welding interface region I. Moreover, the laser beam $L_B$ may be directed substantially parallel to mating surfaces 140, 142 along the interface region I.

In another exemplary illustration, a laser beam $L_A$ may be directed substantially parallel to piston axis 114 when directed to welding interface region O, along the upper surface 110 of the piston 100. Moreover, the laser beam $L_A$ may be substantially parallel to mating surfaces 144, 146 between the body 102 and ring 104, respectively, along the interface region O.

Cooling gallery 108 may advantageously define one or more openings 150 that allows for gases to escape during a laser welding process. The provision of at least one opening may be beneficial during the welding process, when any gases or air present inside the cooling gallery 108 will tend to expand rapidly. The openings may thereby prevent damage to the cooling gallery 108 and adjacent surfaces of the piston 100 due to the expansion of gases or air. Moreover, a "keyhole effect" of the expanding gases may damage the weld along the interface regions I, O. More specifically, as the weld seals the cooling gallery 108, expanding gases will tend to damage the weld zone by escaping through the molten material before the material adequately hardens, unless an escape path is provided for the expanding gases, e.g., by the openings. Additionally, openings may be needed to allow coolant, e.g., oil, to be circulated through the cooling gallery during operation. In one exemplary illustration, one or more openings, e.g., opening 150, are provided in the cooling gallery 108 in a lower surface thereof, thereby allowing the openings to be employed as oil/cooling circulation inlets or outlets during operation of the piston 100. As will be further described, opening(s) 150 may also be employed for removing granulated media, such as sand, that may be positioned within the cooling gallery prior to welding so that weld spatter emitting from the weld and within cooling gallery 108 is absorbed by the granulated media and prevented from depositing on the walls of cooling gallery 108.

The piston body 102 and cooling gallery ring 104 may be constructed from any materials that are convenient, e.g., which are susceptible to being laser welded. Merely by way of example, any metallic containing compounds that are receptive to being laser welded may be employed. In one exemplary illustration, the body 102 and cooling gallery ring 104 are formed of the same material, e.g., steel. In another example, the body 102 and cooling gallery ring 104 are formed of different materials. Accordingly, a material used for the components may be more closely matched with the general requirements and operating conditions relevant to each. Piston body 102 may, merely as examples, include different mechanical properties, e.g., yield point, tensile strength or notch toughness, than the cooling gallery ring 104. Any material or combination may be employed for the body 102 and cooling gallery ring 104 that is convenient. Merely as examples, the body 102 and/or cooling gallery ring 104 may be formed of a steel material, cast iron, aluminum material, composite, or powdered metal material. The body 102 and/or cooling gallery ring 104 may also be formed in different processes, e.g., the body 102 may be a generally single cast piece, while the cooling gallery ring 104 may be forged. Any material and/or forming combination may be employed that is convenient.

Although steel materials having generally high carbon equivalent values have been traditionally ill-suited for welding in general, in one exemplary illustration a relatively high-carbon equivalent value steel is used for at least one of the body 102 and cooling gallery ring 104. For example, a steel having a carbon content of 0.38%, e.g., 38MnVS6 or a carbon content of 0.42%, e.g., 42 CrMo4, may be employed. Carbon equivalent values may be somewhat higher than actual carbon content on a percentage by weight basis.

The ring 104, due in part to its location at the radially outer region of the combustion bowl 120, may in particular require resistance to high temperatures and pressures, and may have a lower thermal conductivity than the body 102. Accordingly, heat-resistant material, such as Inconel, may be employed. The ring 104 may also require a higher corrosion and/or oxidation resistance than the body 102. In another exemplary illustration, a material employed for the ring 104 has a relatively low sulfur content. A low sulfur content may result in a more consistent and higher-quality weld along both the inner and outer interface regions I, O.

In another exemplary illustration, a higher nickel content in at least one of the body 102 and ring 104 may improve weld quality. Moreover, in some examples a nickel-based material may be added, e.g., a nickel-iron as a filler material, during the welding process to promote a higher quality weld.

Prior to securing the body 102 and ring 104 together, e.g., via laser welding, the body 102 and ring 104 may be pre-assembled in a secure and yet non-permanent manner. For example, a shrink fit or interference fit between the two components may be employed. In one example, the body 102 is placed at an elevated temperature, initiating a thermal expansion sufficient to allow insertion of the ring 104 into the body 102. Upon cooling of the body 102 to a lower temperature, the thermal expansion of the body 102 is reversed, thereby constraining the ring 104 in place. In another exemplary illustration, the body 102 and ring 104 are formed of materials having different coefficients of thermal expansion, such that application of heat to both components results in a greater degree of thermal expansion of the body 102, allowing insertion of the ring 104.

A small weld tack may, alternatively or in addition to the shrink fit or interference fit described above, be employed to further secure the body 102 and ring 104 together prior to permanently joining the body 102 and ring 104, e.g., in a laser welding process.

A laser welding process may advantageously allow for smaller heat-affected zones in the components being welded together, e.g., of only a few millimeters, as noted above. However, the relatively small heat-affected zone may also result in an extreme temperature gradient within the material adjacent the heat affected zone or weld. Accordingly, cracks may propagate in the welded material due to the large temperature change in the material over a very small distance. It may therefore be desirable to reduce this gradient by pre-heating the welded components, e.g., in a furnace or by induction. In one exemplary illustration, both the body 102 and ring 104 are heated to between approximately 200 and 600 degrees Celsius.

Any variety of laser welding systems may be employed as part of an exemplary laser welding process. For example, a solid state, disk, carbon-dioxide, or fiber laser may be employed. Carbon-dioxide laser systems are well known and may therefore be more familiar in mass manufacturing settings than, for example, more recently developed fiber laser systems. However, a carbon-dioxide laser process also typically requires a large machine that cannot be easily moved, e.g., around a manufacturing facility, whereas a solid state laser may be employed anywhere a fiber or light-transmitting medium can be extended.

Typically, a thicker weld joint may require a greater power laser to properly melt the materials being joined. In one exemplary illustration, a 6 millimeter (mm) thickness of the materials being joined is adequately welded with a 6 kilowatt (kW) laser at a feed rate of 2.0 meters per minute, using a beam width or thickness of 300-400 micrometers (μm).

As noted above, the laser welding process may be particularly advantageous because of a relatively small heat-affected zone, in some cases only a few millimeters beyond the weld joint, but may also suffer from an extreme temperature gradient in the material(s) adjacent the weld over a correspondingly short distance. To prevent cracks or low-quality welds that might otherwise occur due in part to this temperature gradient, the laser process may itself be controlled to reduce spatter that may result within the cooling gallery 108. In one example, laser power may be ramped down gradually, allowing a controlled decrease in temperature in the material from a maximum temperature associated with the melting of the material that occurs during the welding process. In one exemplary illustration, a gradual ramp-down in laser power is employed that may more gradually decrease weld material temperature, instead of immediately ceasing the welding activity and initiating a more severe cooling temperature gradient in the material.

In one exemplary illustration of a laser welding cool down, a weld laser continues to move along a weld path, e.g., along the interface regions I and/or O moving around a perimeter of the piston 100, as power to the laser is gradually reduced until the laser is turned off entirely. In another exemplary illustration, the laser travels between approximately five (5) and forty (40) degrees angularly with respect to the piston 100 from a time at which laser power begins to be reduced, and a time at which the laser power is cut off entirely. In yet another example, the laser power may decrease linearly during the ramp-down with respect to time and/or angular position of the piston 100. Additionally, it may be desirable to initiate the ramp-down of the laser power in a lower stress area of the piston 100, e.g., a position along the interface regions I and/or O where internal stresses are less than in other areas along interface regions I and/or O. A controlled reduction in material temperature may be further enhanced by a pre-heating of the body 102 and/or cooling gallery ring 104, as the pre-heating may decrease an overall difference in temperature across the piston 100 during the welding process.

A laser welding process may inherently cause at least some degree of weld spatter beyond the interface regions I, O, and in particular to emit within the cooling gallery 108. Accordingly, it may be desirable to reduce spatter by placing a loose granulated media or material within cooling gallery 108 to catch any spatter, which can be subsequently removed. After welding the body 102 and ring 104 together, any weld spatter may be removed from the cooling gallery 108 by removing the loose granulated material. In one exemplary illustration, a high pressure flushing operation may be employed, where a fluid is circulated through the cooling gallery 108 at high pressure.

Figure 3A:
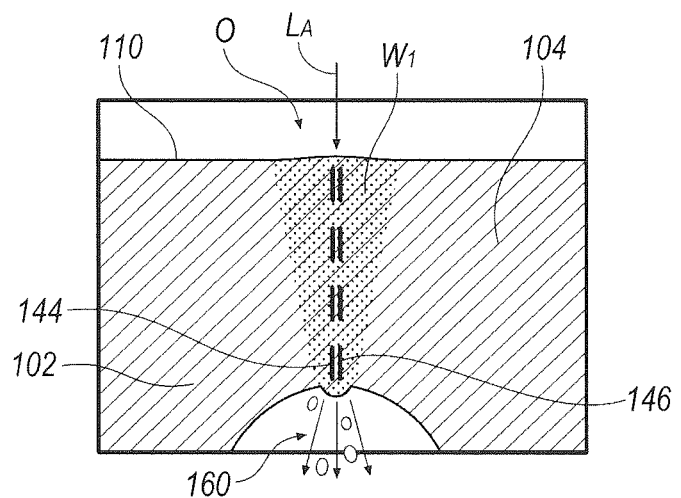
FIG. 3A illustrates a section view of an exemplary laser weld of a radially outer interface region between a piston body and a cooling gallery ring.
Figure 3B:
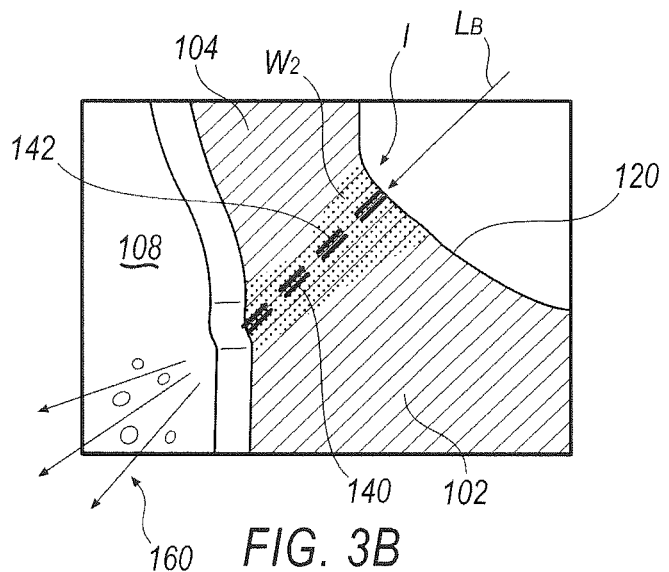
FIG. 3B illustrates a section view of an exemplary laser weld of a radially inner interface region between a piston body and a cooling gallery ring.
Figure 3C:
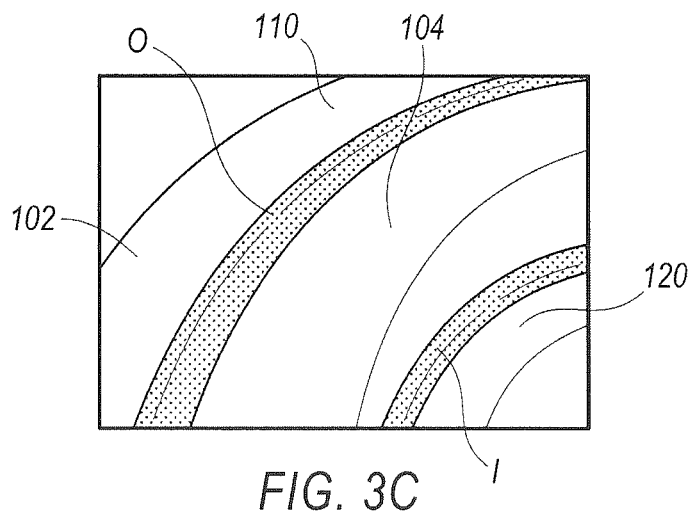
FIG. 3C illustrates a perspective view of exemplary laser welds of a radially inner interface region and a radially outer interface region between a piston body and a cooling gallery ring.

Various examples of laser welding between a ring 104 and body 102 are illustrated in FIGS. 3A and 3B, and FIG. 3C shows a top view of body 102 having interface regions I and O therein. FIG. 3A, for instance, shows weld $W_1$ being formed by laser $L_A$ in which a weld spatter 160 is emitted therefrom. Likewise, FIG. 3B shows weld $W_2$ being formed by laser $L_B$ in which weld spatter 160 is emitted therefrom as well.

As shown in FIG. 3A the body 102 and ring 104 are joined together in the radially outer interface region O. Weld $W_1$ is shown between the body 102 and ring 104 that encompasses the mating surfaces 144, 146 (shown in phantom) of the body 102 and ring 104, respectively, such that the mating surfaces 144, 146 are generally secured together. As shown in FIG. 3B as well, the body 102 and ring 104 are joined together in the radially inner interface region I. Weld $W_2$ is shown between the body 102 and ring 104 encompasses the mating surfaces 140, 142 (shown in phantom) of the body 102 and ring 104, respectively, such that the mating surfaces 140, 142 are generally secured together. FIG. 3C illustrates a perspective view of exemplary laser welds of a radially inner interface region and a radially outer interface region between a piston body and a cooling gallery ring.

The exemplary pistons 100 disclosed herein may be employed in small and large bore diameter applications, generally without limitation. Compression height, i.e., ratio of piston diameter to a distance between the upper surface 110 and a center of the bore defined by the pin bosses 105 may be reduced.

Figures 4A, 4B:
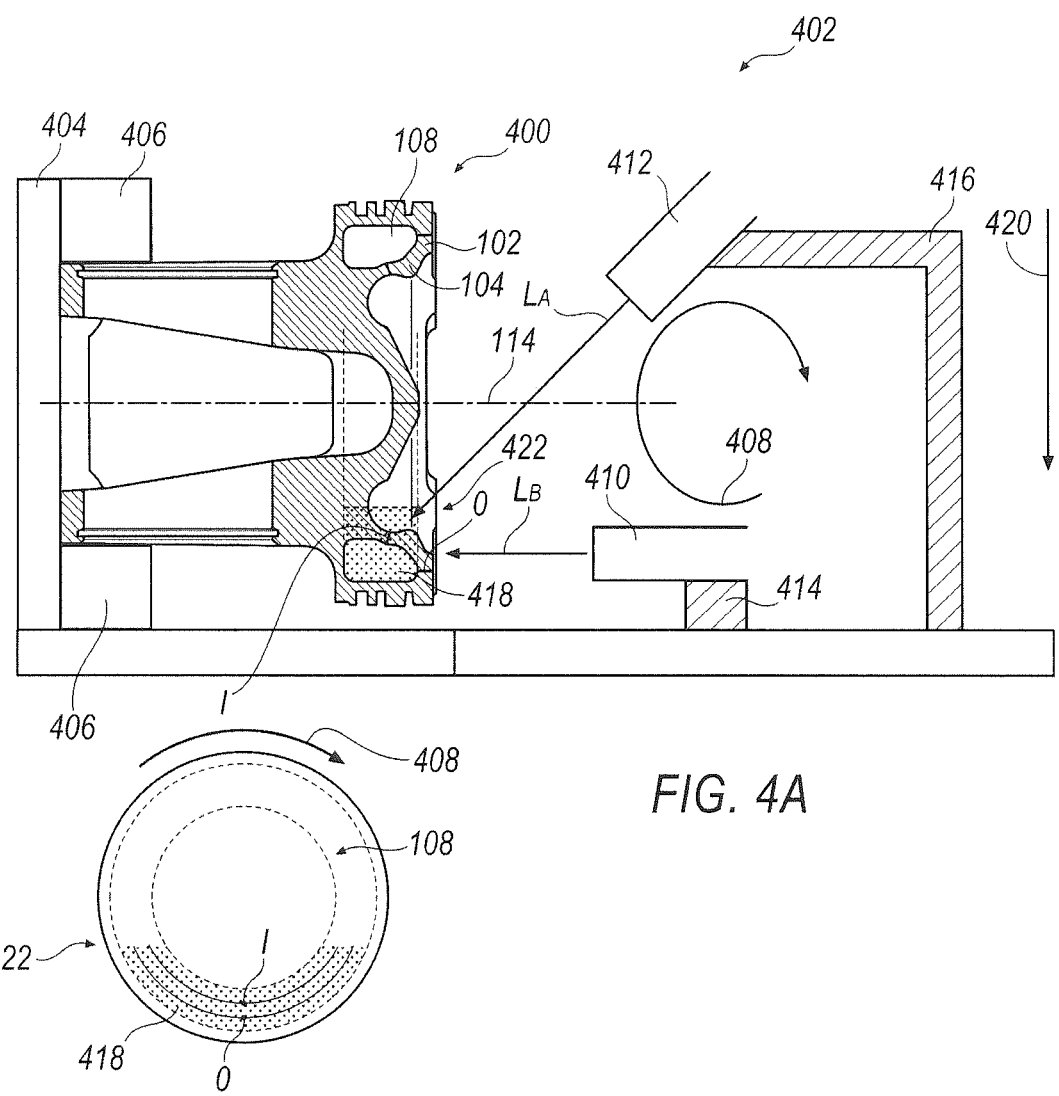
FIG. 4A illustrates a side view of a piston assembly having a loose media within a cooling gallery.
FIG. 4B illustrates a plan view of the piston assembly of FIG. 4A.

Referring now to FIG. 4A, a side view of a piston assembly 400 is shown, the piston assembly 400 comprising piston body 102 and cooling gallery ring 104. Piston assembly 400, also a pre-weld assembly, is formed by positioning the two components 102, 104 together for welding and then placing assembly 400 in a welding system 402 that includes fixture 404 having a clamp 406, in which piston assembly 400 is contained or clamped. Clamp 406 is configured to hold or secure piston assembly 400 and rotate 408 piston assembly 400 about axis 114. Rotation of clamp 406 may be controlled by a controller (not shown) in a fashion to enable welding in the fashion described above. System 402 includes a first welding device such as laser 410 and a second welding device such as laser 412 that are held or otherwise supported by first support structure 414 and second support structure 416. Each laser 410, 412 is directed toward piston assembly 400 and each laser 410, 412 emits respective lasers $L_A$ and $L_B$. As stated, lasers 410, 412 are directed toward assembly 400 and form welds $W_1$ and $W_2$ at respective locations O and I, as illustrated in FIGS. 3A-3C. As also stated, as welds $W_1$ and $W_2$ are formed, each is prone to emit spatter 160 into cooling gallery 108. As such, a loose or granulated material or media 418 is positioned within cooling gallery 108 that can absorb spatter 160 that emits from $W_1$ and $W_2$ during the welding process.

Loose media 418 includes granulated or granular material that is sufficiently small such that, when positioned within cooling gallery 108, media 418 is able to shift and move within cooling gallery 108, and remain at a gravitationally low point therein. In one example media 418 is less than 2 mm in diameter and may include materials resistant to melting or burning at temperatures experienced by the weld process. Media 418 may include but is not limited to materials such as sand, ceramic, porcelain, and aluminum oxide, as examples. In such fashion, during the weld process and while assembly 400 is caused to rotate to form welds $W_1$ and $W_2$ at respective locations O and I, media 418 shifts therein such that media 418 is always in position to absorb weld spatter 160. That is, lasers 412 and 410 are caused to emit respective lasers $L_A$ and $L_B$ toward a gravitationally low point of cooling gallery 108 such that media 418 therein will be in position to absorb weld spatter, despite the rotation 408 of assembly 400.

As shown in FIG. 4A, piston assembly 400 is maintained within welding system 402 such that axis 114 is approximately orthogonal to a direction of gravity 420. As assembly 400 is caused to rotate 408, media 418 shifts within cooling gallery 108 but remains generally at a gravitationally low point and with an elevation 422. As seen also in FIG. 4B, which is a plan view of assembly 400, lasers are directed toward locations O and I to form welds $W_1$ and $W_2$, and spatter is precluded from depositing on walls within cooling gallery 108 because locations O and I are maintained at a gravitationally low point, where media continually shifts to during rotation 408 of assembly 400.

Figure 5:
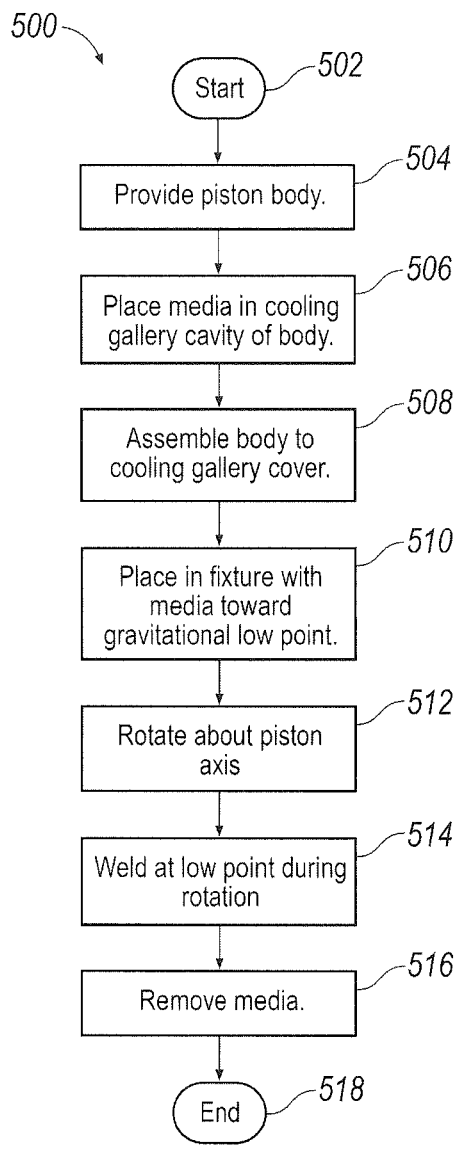
FIG. 5 illustrates a process flow diagram for an exemplary method of welding a piston assembly.

As such, referring to FIG. 5, a welding process 500 starts at step 502 and includes providing a piston body at step 504. For example, the piston body may be piston body 102 in which a cavity is included that forms a portion of cooling gallery 108. At step 506, media 418 is placed within the cavity of cooling gallery 108, and the body 102 is assembled to cooling gallery cover 104 at step 508 to form pre-weld assembly 400. The assembly 400 is placed within fixture 402 at step 510 and positioned such that axis 114 is approximately or generally orthogonal to direction of gravity 420, in one example. In such fashion, loose media 418 is caused to fall or shift to a gravitationally low point within cooling gallery 108. In another example, assembly 400 is positioned with axis 114 non-orthogonally with respect to direction of gravity 200, but in such fashion that media 418 remains at a gravitational low point within cooling gallery 108. Assembly 400 is caused to rotate 408 about piston axis 114 at step 512 and, while doing so, media 418 is caused to remain at the gravitationally low point. That is, rotation of assembly 400, the rate of which is decided primarily based on weld requirements for laser welding, is also sufficiently slow so as not to centrifugally cause media 418 to remain in a fixed location within cooling gallery 108, but rather stay near the gravitational low point.

During rotation of assembly 400, at step 514 either or both of lasers 410, 412 is caused to form welds at locations O and I as described above. In such fashion, with media 418 remaining at the gravitational low point and at approximate elevation 422, weld formation occurs with any weld spatter 160 being caused to emit into media 418, protecting walls of cooling gallery 108 from weld spatter in the process. In one example, rotation of assembly is at a sufficiently high rate to partially pull a general or collected mass of loose media approximately off-center from the low point. In this example the center of mass of the media is slightly offset from the gravitational low point, and the location of welding may be adjusted wherein welding the cooling gallery ring to the piston body includes welding at a location that is approximately centered on the collected mass of the loose media as the loose media shifts within the cooling gallery as a result of rotating the pre-weld assembly.

Upon completion of the weld(s), assembly 400 is removed from fixture 402 and media 418 is removed from cooling gallery 108 at step 516. Media 418 may be removed in any number of fashions that includes simply shaking assembly to remove media 418 and weld spatter 160 through openings 150. Or, media 418 and weld spatter 160 may be removed via a wet process by flushing with a solvent or other liquid. Media 418 and weld spatter 160 may also be removed by blowing dry air or an inert gas therein through openings 150. The process ends at step 518.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
providing a piston body having a piston axis, the piston body having a cavity forming a portion of a cooling gallery that is circumferentially disposed about the piston axis;
providing a cooling gallery ring;
assembling the cooling gallery ring with the piston body to form a pre-weld assembly, such that the cavity of the piston body and cooling gallery ring cooperate to form the cooling gallery and encompass a loose media;
intentionally positioning the loose media within the cavity after assembling the pre-weld assembly;
positioning the pre-weld assembly such that the loose media displaces to a gravitationally low portion of the cooling gallery; and
laser welding the cooling gallery ring to the piston body at the gravitationally low portion of the cooling gallery to form a weld joint such that weld spatter emitted during laser welding is emitted into the loose media, wherein laser welding the cooling gallery ring to the piston body comprises directing a laser beam toward a pair of surfaces that include a surface of the cooling gallery ring and a surface of the piston body.

2. The method of claim 1, further comprising positioning the pre-weld assembly such that the piston axis is approximately orthogonal to a direction of gravity.

3. The method of claim 1, further comprising rotating the pre-weld assembly about the piston axis while laser welding the cooling gallery ring to the piston body such that the loose media shifts within the cooling gallery and remains generally at the gravitationally low portion of the cooling gallery.

4. The method of claim 3, wherein laser welding the cooling gallery ring to the piston body comprises laser welding at a location that is the gravitationally low portion but also approximately centered on a collected mass of the loose media as the loose media shifts within the cooling gallery as a result of rotating the pre-weld assembly.

5. The method of claim 1, wherein positioning the loose media comprises positioning one of a sand material, a ceramic, a porcelain, and an aluminum oxide.

6. The method of claim 1, wherein positioning the loose media comprises positioning granulated material having a diameter less than 2 mm.

7. The method of claim 1, further comprising filling a lateral cross section of the cooling gallery with the loose media while laser welding the cooling gallery ring to the piston body.

8. A method, comprising:
assembling two components that include a cooling gallery ring with a piston body to form a piston assembly, such that a cavity of the piston body and cooling ring cooperate to form a cooling gallery;
intentionally positioning a granular material within the cooling gallery after assembling the two components;
positioning the piston assembly for laser welding the two components thereof, the cooling gallery circumferentially disposed about a perimeter thereof and formed by at least the two components;
orienting the piston assembly such that the granular material positioned within the cooling gallery is displaced to a low gravitational portion of the cooling gallery; and
laser welding the two components together at the low gravitational portion of the cooling gallery to form a weld joint between the two components, such that weld spatter emitted during laser welding passes to the granular material, wherein laser welding the two components together comprises directing a laser beam toward a pair of mating surfaces of the cooling gallery ring and the piston body.

9. The method of claim 8, further comprising positioning the piston assembly such that an axis of the piston is approximately orthogonal to a direction of gravity.

10. The method of claim 8, further comprising rotating the piston assembly about the axis of the piston while laser welding the two components such that the granular material shifts within the cooling gallery and remains generally at the low gravitational portion of the cooling gallery.

11. The method of claim 10, wherein laser welding the two components comprises laser welding at a location that is approximately centered on a collected mass of the granular material at the gravitationally low portion but as the granular material shifts within the cooling gallery as a result of rotating the piston assembly.

12. The method of claim 8, wherein the granular material comprises one of a sand material, a ceramic, a porcelain, and an aluminum oxide.

13. The method of claim 8, wherein positioning the granular material comprises positioning material having a grain sizes that are less than 2 mm.

14. The method of claim 8, further comprising filling a lateral cross section of the cooling gallery with the loose media while laser welding the cooling gallery ring to the piston body.

* * * * *